Figure 1:
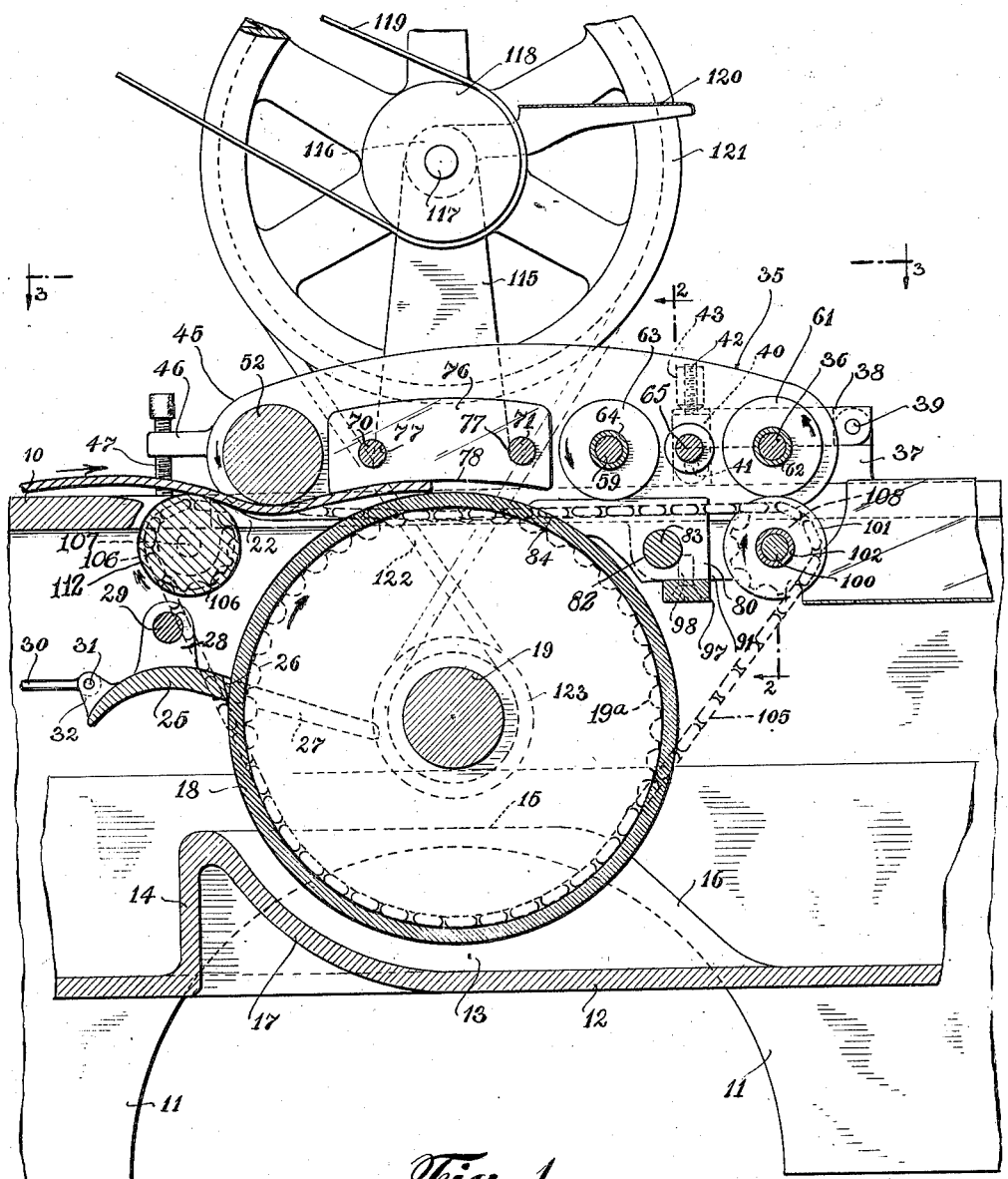

Aug. 3, 1937.  C. H. COULSON  2,088,947
PASTING MACHINE
Filed March 13, 1935  3 Sheets-Sheet 1

INVENTOR.
Charles H. Coulson,
BY
Munn, Anderson & Liddy
ATTORNEYS.

Aug. 3, 1937.  C. H. COULSON  2,088,947
PASTING MACHINE
Filed March 13, 1935  3 Sheets-Sheet 3
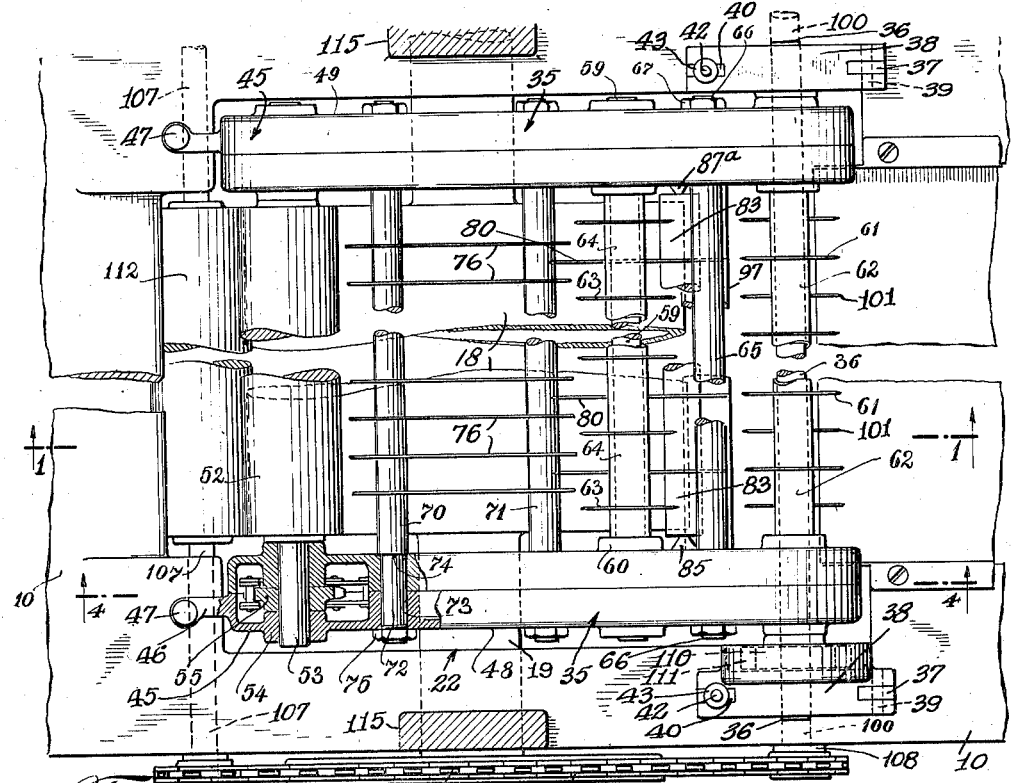
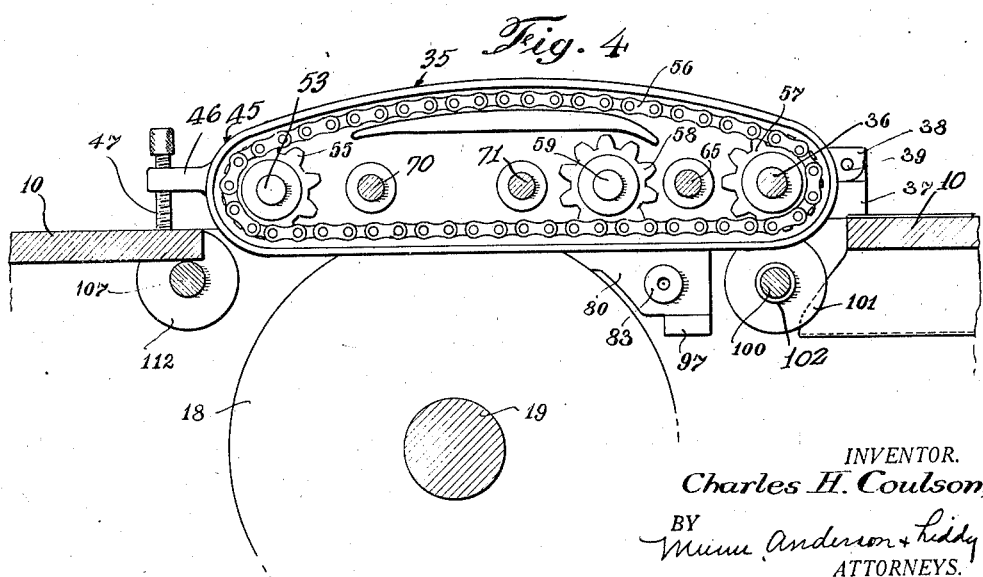
INVENTOR.
Charles H. Coulson,
BY
Munn Anderson & Liddy
ATTORNEYS.

Patented Aug. 3, 1937

2,088,947

UNITED STATES PATENT OFFICE 2,088,947

PASTING MACHINE

Charles H. Coulson, Hanover, Pa.

Application March 13, 1935, Serial No. 10,941

6 Claims. (Cl. 12—80)

This invention relates to a machine for applying adhesive to surfaces of materials.

An object of the invention is the provision of a machine for applying adhesives to a surface of a piece of material in which a cylinder projects into a paste solution in a container whereby the surface of the cylinder is supplied with a thin layer of paste, driven rollers being provided for moving the soles over the top of the pasting cylinder with one of the driven rollers being mounted for rotation in the free end of a pivotally mounted frame, the frame carrying guides and pressure means for maintaining the soles in alignment with the pasting cylinder and for maintaining the soles in contact with a portion of the revolving cylinder, the last-mentioned means being carried by the frame, a pair of spaced driven shafts being located adjacent the other end of the frame with discs secured to the shafts in staggered relation with each other for receiving and moving the pasted pieces of material from the device, one of the shafts upon which the discs are mounted being carried by the frame, said frame being movable upon its pivot away from the cylinder whereby the rollers, guiding means, and the discharging means may be moved as a unit away from the pasting cylinder for the purpose of cleaning said rollers, the guiding means and the discharging means.

Another object of the invention is the provision of a device for applying paste to one face of the soles for footwear in which a pasting cylinder is revolved at a predetermined speed and having one portion movable through a container provided with a liquid paste which is picked up by the surface of the cylinder, a pair of driven rollers being employed for drawing the soles toward and over an exposed portion of the pasting cylinder, spaced plates being located above the pasting cylinder and provided with curved edges which are adapted to engage the soles and force them in contact with the revolving pasting cylinder, spaced discs being disposed adjacent the ends of the plates for engaging the soles and moving them over a plurality of plates whose upper edges are adapted to support the soles, the edges of the last-mentioned plates being located in staggered relation with the discs so that the contacting portions of the discs and plates with the soles will be alternately placed, with spaced means for engaging the opposite faces of the soles for drawing the soles away from the spaced plates, one group of the last-mentioned means being located in alternate relation with the other group of said means.

A further object of the invention is the provision of a pasting machine which will apply the paste to one face of the soles used in the manufacture of footwear while preventing the paste from being applied to those portions of the soles where it is not intended.

This invention will be best understood from a consideration of the following detailed description, in view of the accompanying drawings forming a part of the specification; nevertheless, it is to be understood that the invention is not confined to the disclosure, being susceptible of such changes and modifications as define no material departure from the salient features of the invention as expressed in the appended claims.

Figure 2:
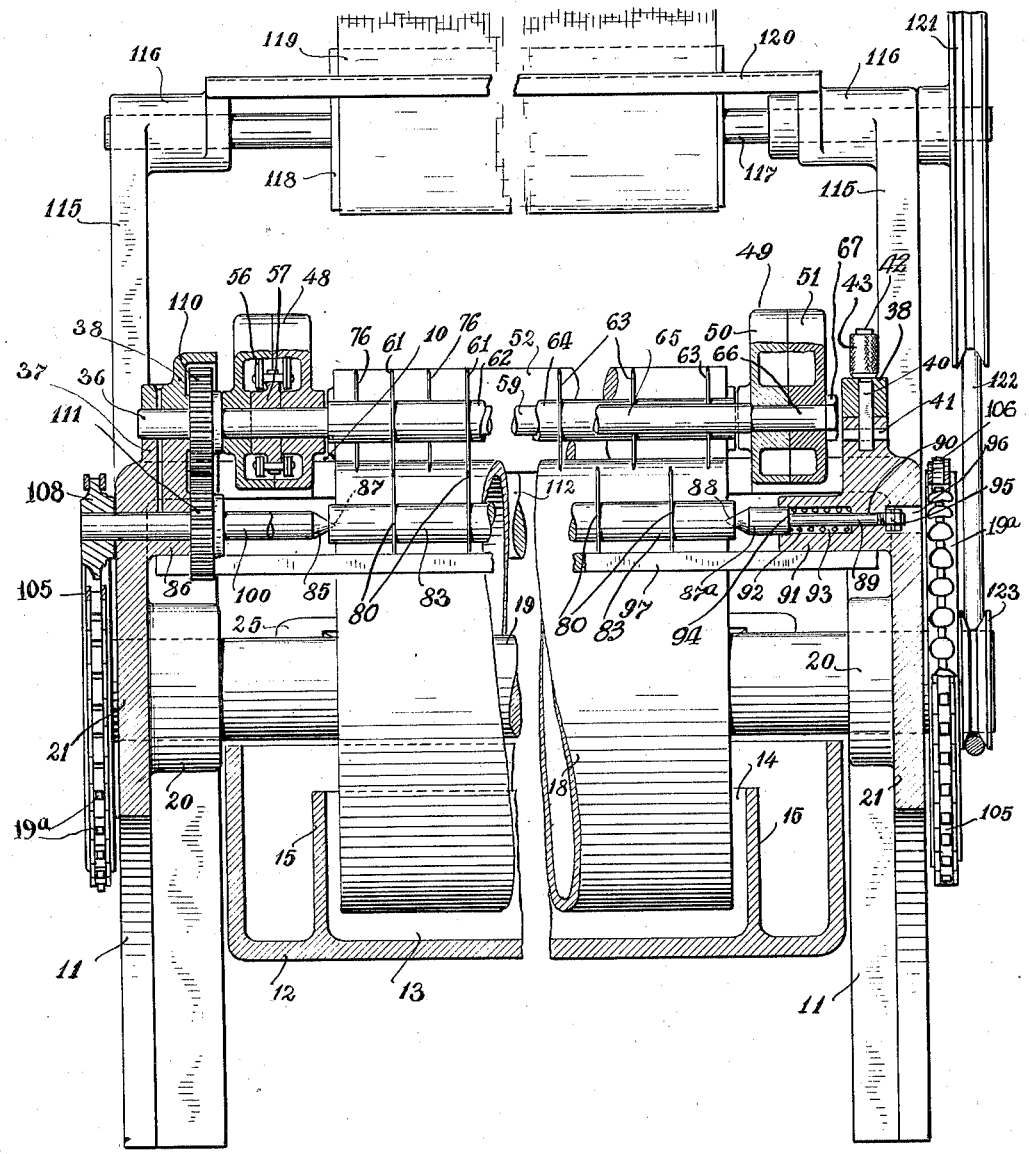

In the drawings:

Figure 1 is a longitudinal vertical section taken along the line 1—1 of Figure 3, Figure 2 is a transverse vertical section taken along the line 2—2 of Figure 1, Figure 3 is a horizontal section with parts broken away taken along the line 3—3 of Figure 1, and Figure 4 is a fragmentary vertical section taken along the line 4—4 of Figure 3.

Referring more particularly to the drawings, 10 designates a table top supported by legs 11.

A paste container generally designated by the numeral 12 is supported by the table in any approved manner. This container extends lengthwise of the table and has a chamber 13 enclosed by an end wall 14 and side walls 15. The chamber 13 is located substantially centrally of the tank or container 12 and has its side walls 15 sheared off, as shown at 16, so that one end of the chamber opens into the tank 12. The bottom of the chamber 13 is curved upwardly, as shown at 17, and joins the end wall 14. The curved portion 17 is concentric with the outer surface of a pasting cylinder 18.

The pasting cylinder is driven by an axially mounted shaft 19 which carries the cylinder and, in turn, is mounted in bearings 20 formed integrally with side plates 21 of the table 10. The shaft 19 is driven in any approved manner.

When the pasting cylinder 18 is revolved the portion which is suspended in the chamber 13 picks up the paste on its surface and carries it upwardly through the opening 22 in the table 10. A scraper, however, is employed for maintaining a predetermined thickness of the paste on the cylinder and removes excess paste therefrom. This scraper is in the form of a curved plate 25 having an edge 26 extending the length of the cylinder 18. This plate is provided with a pair of side arms 27 which engage the ends of the cylinder for removing paste. The plate is supported by means of ears 28 and a rod 29 extending between the side walls of the table and supported thereby.

The edge 26 of the scraper per se may be adjusted towards or away from the surface of the cylinder 18 by means of a rod 30 which extends to one end of the table and is provided with a manipulating rod (not shown). This rod is pivotally connected at 31 with ears 32 connected to the plate 25.

A frame, generally designated by the numeral 35, (Fig. 1) has one end pivotally mounted on a shaft 36 and the ends of the shaft are mounted in a split bearing formed of the members 37 and 38. The member 37 is secured to the table 10 while the member 38 is pivotally connected at 39 with the member 37 and is swingable outwardly from the member 37 when it is desired to remove the frame 35. The section 38 of the bearing is held in place by means of a yoke 40 pivotally mounted at 41 on the member 37. A screw 42 projects upwards from the upper end of the yoke 40 and carries a manipulating member or nut 43 which when revolved in the proper direction clamps down against the member 38 for holding it in position upon the bottom bearing member 37. It will be noted from Fig. 3 that substantially identical constructions of the bearing members and locking yokes are provided at each side of the machine.

The frame 35 is pivotally mounted upon the shaft 36 and is swingable on its pivot so that the free end 45 may be moved outwardly from the pasting cylinder 18 when it is desired to repair or clean any of the parts carried by the frame. The opposite or free end 45 of the frame is supported by means of lugs 46 which extend outwardly from the end of the frame and these lugs receive set screws 47 which support the weight of the frame upon the table 10 and also for the purpose of properly adjusting the height of the free end of the frame relative to the table 10. The height of the free end 45 of the frame from the table depends upon the wear on the parts of the device and also the thickness of the soles passing through the device as will be presently explained.

The frame consists of a pair of side members generally designated by the numerals 48 and 49 (Fig. 2). Each side member consists of a pair of sections 50 and 51 which are secured together and maintained in spaced parallel relation in a manner which will be presently explained.

A driven roller 52 has reduced portions 53 at its opposite ends which are received within bearings 54 of the side members 48 and 49.

Between the sections 50 and 51 of the side member 48 and completely housed by said sections is a sprocket 55 which is secured to the reduced portion 53 of the roller 52 in any approved manner. A chain 56, as shown in Fig. 4, is trained on the sprocket 55 and also on a sprocket 57 secured to the shaft 36 whereby the chain is driven positively by the rotation of the shaft 36.

A third sprocket 58 is secured to a shaft 59 which is mounted in bearings 60 carried by the side members 48 and 49 of the frame.

The shaft 36 is provided with a plurality of spaced discs 61 and these discs are maintained in spaced relation by sleeves 62 received by the shaft 36. These discs are relatively thin so that they will engage as little of the upper surface of the soles as possible. The shaft 59 is also provided with a plurality of spaced discs 63 which are held in spaced relation by means of sleeves 64 received by the shaft 59. These discs are likewise relatively thin so that they will engage as little of the surface of the soles as possible.

A spacer rod 65 is provided at its ends with reduced portions 66 (Fig. 3) which are threaded to receive nuts 67 and shoulders which abut the inner faces of the members 48 and 49 for aiding in securing the members 48 and 49 in spaced relation.

Rods 70 and 71 also act to maintain the members 48 and 49 in spaced relation and are also provided with reduced portions 72, the reduced portions at their ends to be received within passages 73 of the members 48 and 49. The reduced portions provide shoulders 74 which abut the inner faces of the members 48 and 49 while nuts 75 threaded onto the ends of the rods not only secure the rods in place but also secure the members 48 and 49 in spaced relation.

A plurality of relatively thin plates 76 are provided with passages 77 to receive the rods 70 and 71 and these plates are secured to the rods in any approved manner. The lower edges of these plates are curved, as shown at 78 to engage the upper faces of the soles when said soles are passing between the plates 76 and the exposed surface of the pasting cylinder 18 and for curving the soles slightly over the curved exposed portion of the cylinder.

Co-operating with the discs 63 on the shaft 59 are a plurality of plates 80 which have their upper edges 81 disposed substantially in a horizontal plane and these plates are provided with openings 82 to receive a rod 83 which is secured to the side walls of the table.

The inner free ends of the plates, as shown at 84 (Fig. 1), are curved to conform to the curvature of the pasting cylinder 18 and normally rest thereon. These plates are relatively thin and have substantially the same thickness as the discs 61 and 63. The plates are secured to the shaft 83 in any approved manner.

One end of the shaft or rod 83 (Fig. 2) is supported by a pintle 85 which is carried by a boss 86 secured to a side wall 21 of the table or formed integrally therewith. The pointed end of the pintle, as shown at 87, is received within the socket of the rod 83.

A movable pintle 87ª is provided with a pointed end received within a complementarily formed socket 88 in the other end of the rod or shaft 83. The pintle 87ª is provided with a reduced portion 89 slidably mounted in a bearing 90 formed in a boss 91 which is also formed integrally with a side wall 21 of the table. The boss is provided with a pocket 92 to receive a spring 93 which has one end in engagement with a shoulder 94 on the pintle 87 while the other end of the spring engages the bottom of the pocket 92. The outer end of the rod or reduced portion 89 of the pintle is provided with a nut or collar 95 received in a pocket 96 of the side wall 21 for maintaining the pintle in position while permitting the spring 93 to force the pintle into the socket 88 in the rod 83. By this means the rod 83 together with its connected blades or plates 80 may be readily removed from the machine by forcing the rod to the right in Fig. 2 for releasing the end of the rod 83 from the pintle 85.

The lower edges of the plates or blades 80 are supported by a bar 97 which is secured at 98 to the bosses 86 and 91.

Also mounted in the bosses 86 and 91 is a shaft 100. A plurality of discs 101 are maintained in spaced relation on the shaft 100 by a plurality of sleeves 102 received by said shaft.

The discs 101 are located in staggered relation with respect to the discs 61 on the shaft 36. The discs 63 on the shaft 59 are located in staggered relation with the plates or blades 80. Likewise the plates 76 are located in staggered relation with respect to the discs 63 and the plates 80. This arrangement provides for contact between these elements upon opposite sides of the soles as they are passing through the machine in order to prevent the paste which passes onto the blades 80 and the discs 101 from being transmitted to the discs 61 and 63.

A chain 105 (Fig. 1) driven by a sprocket 19a on the shaft 19 is trained upon a sprocket 106 on a shaft 107 and also on a sprocket 108 on the shaft 100 so that the shafts 100 and 107 are driven when the shaft 19 is revolved. To transfer motion to the various rotating members carried by the swinging frame 35, a gear 110 (Fig. 2), secured to the shaft 36 journaled in the frame, is provided, said gear meshing with a gear 111 on the shaft 100 which is driven through the sprocket 108 and chain 105.

A work supporting roll 112 carried by the shaft 107 is revolved by said shaft at substantially the same speed as the roll 52.

A pair of standards 115 rise from the table 10 and are provided with bearings 116 to receive a shaft 117 which carries a pulley 118 upon which a traveling belt 119 is trained. A table 120 is carried by the bearings 116 and is adapted to receive the pasted soles before they are placed upon the traveling carrier 119.

A pulley 121 is secured to the shaft 117 and a belt 122 is trained on the pulley and is twisted and then trained upon a pulley 123 secured to the shaft 19.

The operation of my device is as follows: The shaft 19 is driven by the belt 122 (Fig. 1), trained on the drive pulley 121. Rotation of the shaft 19 rotates the pasting cylinder 18 and the sprocket 19a, and through the chain 105 applied to said sprocket rotation is imparted to the sprockets 108 and 106 thereby causing rotation of the shafts 100 and 107 which carry the discs 101 and roll 112.

Since the gear 111 (Fig. 2) is fast on the shaft 100 it will be rotated by the chain 105 meshing with the sprocket 108, and through the gear 110 meshing with the gear 111 rotation is imparted to the sprocket 57, and the shaft 36 (Fig. 4) which carries the discs 61.

The chain 56 is driven by the sprocket 57 which in turn is driven by the shaft 36. The chain drives the sprockets 55 and 58. The discs 63 are revolved by the shaft 59 which in turn is driven by the sprocket 58. The roller 52 is revolved by means of the sprocket 55.

The set screws 47 are properly rotated for raising or lowering the free end of the frame 35 whereby the roller 52 will be properly positioned with respect to the roller 112 so that these revolving rollers will exert sufficient pressure on the soles when they are fed from the table 10 to said rollers to cause the soles to be moved upon the top of the revolving paste cylinder 18 whence the curved edges 78 of the plate 76 will force the soles downwardly into contact with the revolving cylinder.

When the leading ends of the soles pass the revolving cylinder they will be supported by the spaced thin plates 80 while the revolving discs 63 will engage the upper or clean surfaces in staggered relation with respect to the horizontal edges of the plates 80 and move the soles forwardly between the staggered discs 61 and 101 which are being revolved whence the soles will be carried forwardly and finally are freed so that the operator may place them upon the table 120 with the pasted face upwardly, whence they may be moved manually upon the traveling carrier 119.

The scraper 26 will be properly adjusted with respect to the revolving surface of the revolving cylinder 18 by means of the operating rod 30 so that excess paste will be forced away from the cylinder and be carried by the curved surface of the plate 25 and be deposited into the container 12 and beyond the wall 14 of the chamber 13. By this construction the paste which has been removed from the cylinder will have to flow around the side wall 16 before it can enter the chamber 13 so that foreign matter may settle to the bottom of the container 12 and not enter the chamber 13 whereby the paste will be maintained in a clean state.

Since the frame 35 which carries the roller 52, the shafts 59 and 36, and the plates 76 is pivotally mounted on the shaft 36 with the free end 45 of the frame being supported by the set screw 47 on the table 10, the free end of the frame may be elevated, thereby carrying with it the plates 76 and the discs 61 and 63 respectively connected with the shafts 36 and 59 whereby the operator may clean these members of paste which has accidentally been discharged thereon. However, the staggered arrangement of the discs 63 with respect to the plates 80 and the staggered relation of the discs 61 with respect to the discs 101 will prevent any excess of paste being picked up by the discs or plates.

Since the horizontal edges 81 of the plates 80 support the pasted face of the soles when they leave the cylinder 18, said plates will collect paste and when desired these plates may be removed bodily with the shaft 83 as has been previously explained by forcing said shaft to the right in Fig. 2 against the tension of the spring 19 whereby the left hand end of the shaft will be released from the pintle 85 and the plates 80 and the shaft 83 may be removed as a unit.

The entire frame 55 is removable as a unit from the table by the release of the sections 38 of the bearings which support the shaft 36 through the set screws 42 and the yokes 43. It will be appreciated, however, that this is particularly true since the gear 110 may be placed in mesh with the gear 111 or removed therefrom when desired.

It will be seen by the present construction that only a very restricted contact is had between the moving parts for forcing the soles after they have been pasted from the machine and the staggered relation of the supporting and moving parts also aids in restricting the contact between the soles and the moving parts.

It will be noted that the machine will not only apply paste or adhesive efficiently to one face of pieces of material but will maintain the other face clean due to the fact that the feeding devices before and after the application of the adhesive are so constructed and operated that they will accomplish this result. The guiding and feeding elements are relatively thin so that only thin edges are presented to the surfaces of the materials. Furthermore, the increased surface speed of the revolving elements coming into contact with the materials after the application of the adhesive will pull the materials away from the cylinder 18 at a greater speed than the feeding in order to prevent back shoveling of the adhesive on the upper side of the materials. In other words the revolving feed rollers have a greater speed of rotation than the pasting roller.

I claim:

1. A machine for applying paste to soles for footwear comprising a pasting cylinder, means for supplying paste to the surface of the cylinder, a frame pivotally mounted at one end and swingable towards or away from the pasting cylinder, a pair of spaced driven rollers for feeding the soles over the pasting cylinder, one of said rollers being rotatably supported in the free end of the frame, a plurality of spaced plates carried by the frame for maintaining the soles in contact with the pasting cylinder, a pair of spaced driven shafts located adjacent the other end of the frame, one of the shafts forming a pivotal mounting for the frame, and spaced discs on the shafts adapted to contact opposite faces of the soles for feeding the soles away from the pasting cylinder.

2. A machine for applying paste to soles for footwear comprising a table, a pasting cylinder rotatably mounted in respect to the table, means for supplying paste to the cylinder, a frame and means by which to pivotally mount it at one end, a plurality of driven shafts mounted for rotation on the frame, one of the shafts forming a pivotal mounting for the frame, means on the shafts for causing the soles to be moved along a path which coincides with the surface of the cylinder and agrees with the direction of its rotation, spaced means supported by the table and co-operating with the means on at least one of the shafts for supporting the soles while aiding in moving them along said path, and means to shift the free end of the frame so as to adjust the frame in reference to the cylinder.

3. A machine for applying paste to soles for footwear comprising a table, a pasting cylinder rotatably supported in respect to the table, a pivotally mounted frame, a shaft carried by one end of the frame, bearings for the shaft on the table and forming the pivotal mounting for said frame, means on the table for supporting the soles in a path which coincides with the surface of the cylinder and agrees with the direction of its rotation, a plurality of shafts rotatably supported in the frame, means on all of the shafts for aiding in feeding the sole along said path, and means for causing rotation of the shafts.

4. A machine for applying paste to soles for footwear comprising a table, a pasting cylinder rotatably supported in respect to the table, a pivotally mounted frame, a shaft carried by one end of the frame, bearings for the shaft on the table and forming the pivotal mounting for said frame, means on the table for supporting the soles in a path which coincides with the surface of the cylinder and agrees with the direction of its rotation, a plurality of shafts rotatably supported in the frame, means on all of the shafts for aiding in feeding the sole along said path, and means for causing rotation of the shafts, each of the bearings having means to permit the frame together with the shafts as a unit to be removed from the table.

5. A machine for applying paste to soles for footwear comprising a table, a pasting cylinder rotatably supported in respect to the table, a pivotally mounted frame, a shaft carried by one end of the frame, bearings for the shaft on the table and forming the pivotal mounting for said frame, means on the table for supporting the soles in a path which coincides with the surface of the cylinder and agrees with its direction of rotation, a plurality of shafts rotatably supported in the frame, means on all of the shafts for aiding in feeding the sole through the path, each of the bearings having means to permit the frame and shafts to be removed as a unit from the table, a driving gear mounted on the table, a gear secured to the first-mentioned shaft and meshing with the gear on the table, means for rotating the driving gear, and means for operatively connecting the shafts together.

6. A machine for applying paste to soles for footwear comprising a pasting cylinder, a tank for paste in which the cylinder revolves, the tank having an opening through which a portion of the cylinder is exposed, means for causing soles to be moved over the exposed portion of the cylinder, means for removing excess paste from the surface of the cylinder and for discharging the excess paste into the tank, a chamber within the tank formed by an end wall and side walls, the cylinder projecting into the chamber, the end of the chamber opposite the end wall being in open communication with the tank, the paste being discharged into the tank beyond the end wall of the tank so that when the discharged paste enters the open end of the chamber foreign matter in the paste will have been deposited on the bottom of the tank.

CHARLES H. COULSON.